April 3, 1951 P. A. NIRDLINGER 2,547,342
REFLECTING MAT FOR DISPLAY WINDOWS
Filed Dec. 3, 1946 4 Sheets-Sheet 1
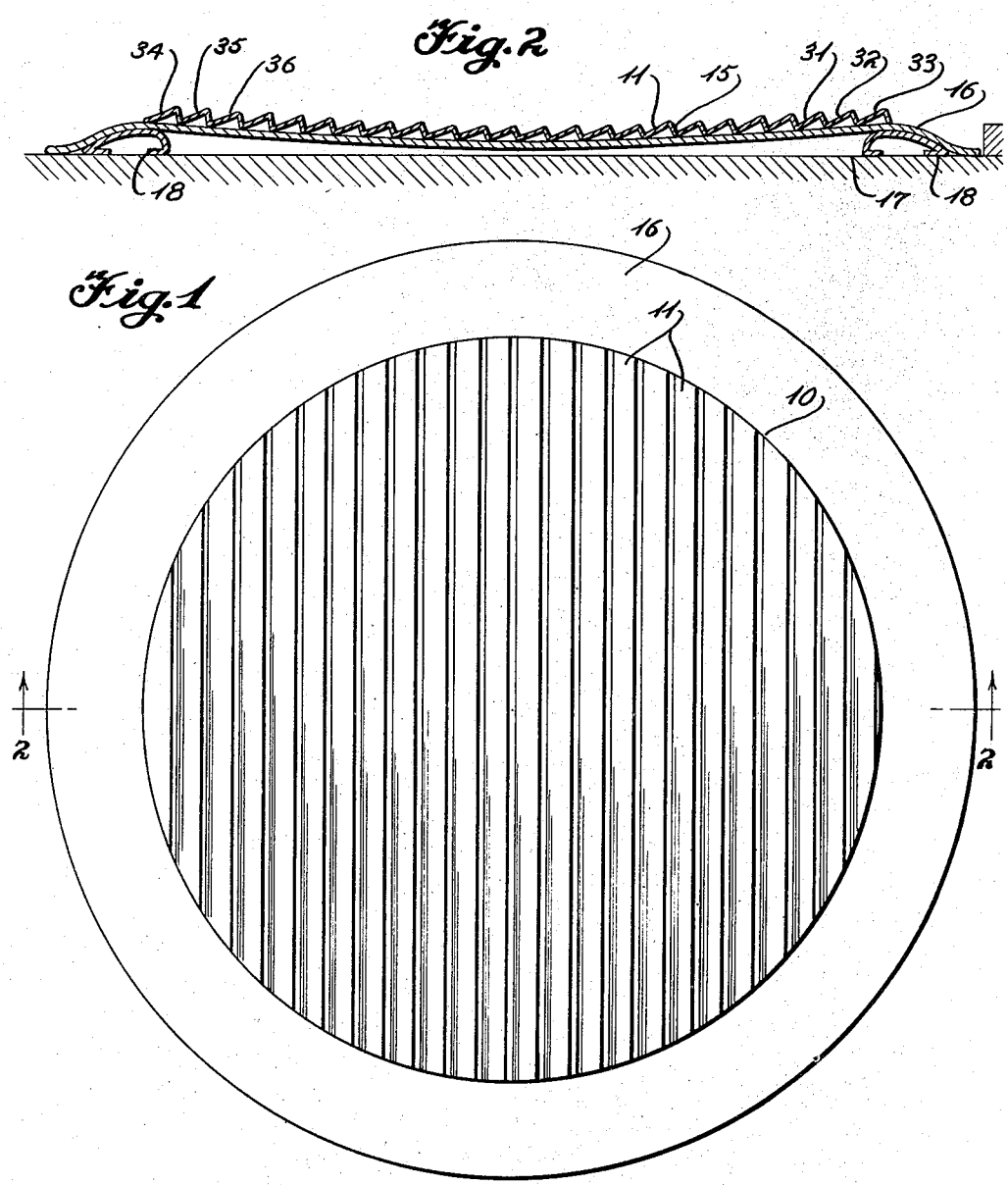
Inventor
Patrick A. Nirdlinger
By Cushman Darby Cushman
Attorneys April 3, 1951 P. A. NIRDLINGER 2,547,342
REFLECTING MAT FOR DISPLAY WINDOWS
Filed Dec. 3, 1946 4 Sheets-Sheet 2
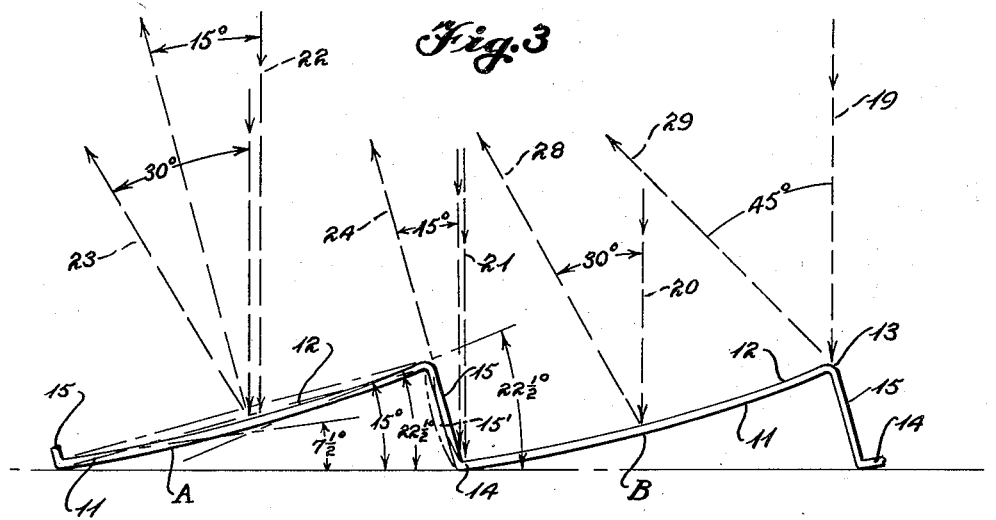
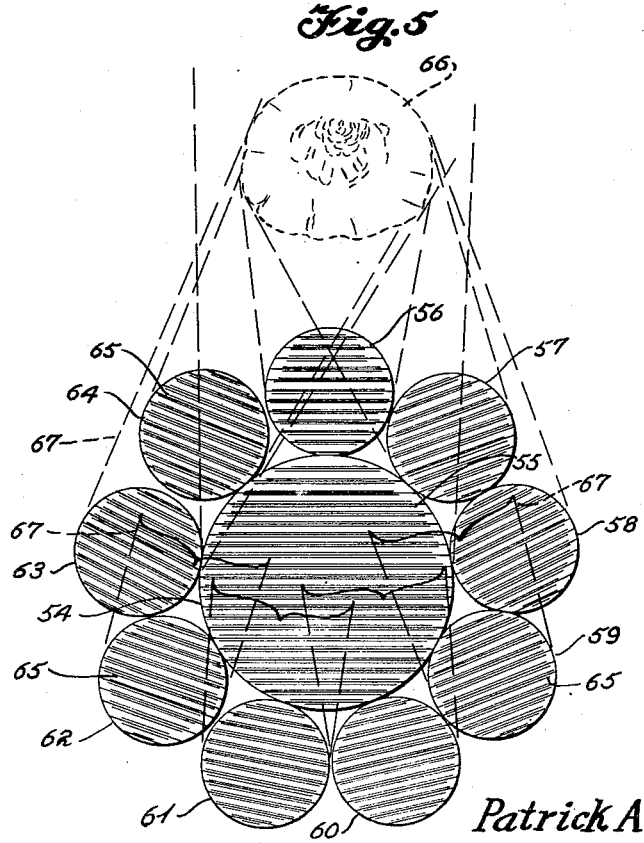
Inventor
Patrick A. Nirdlinger
By Cushman Darby Cushman
Attorneys

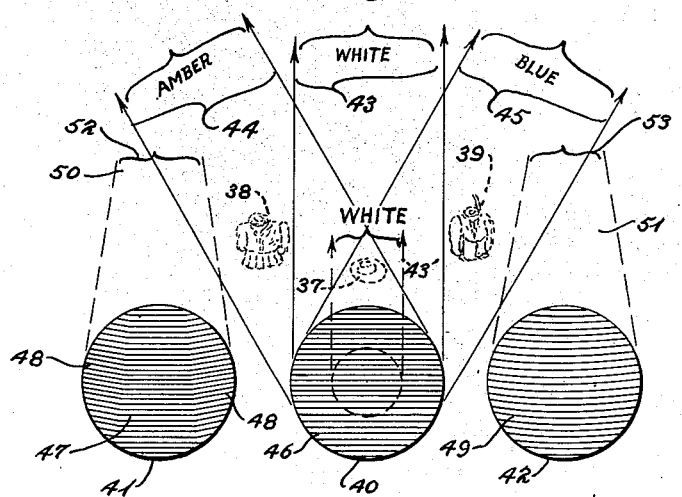
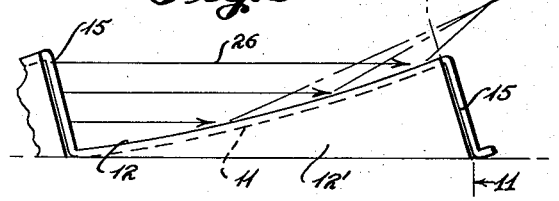
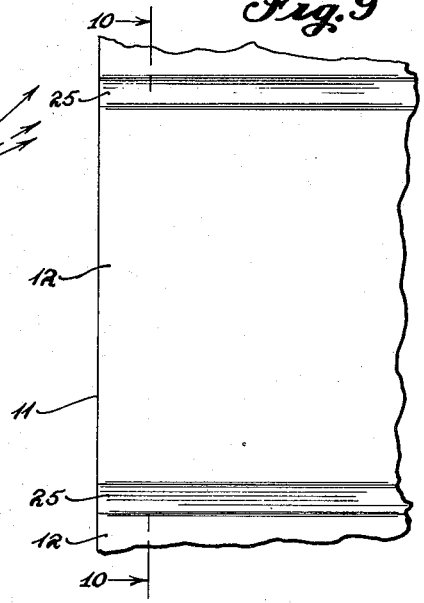
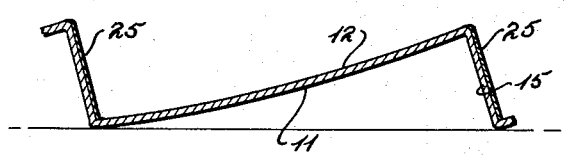
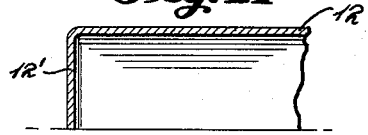

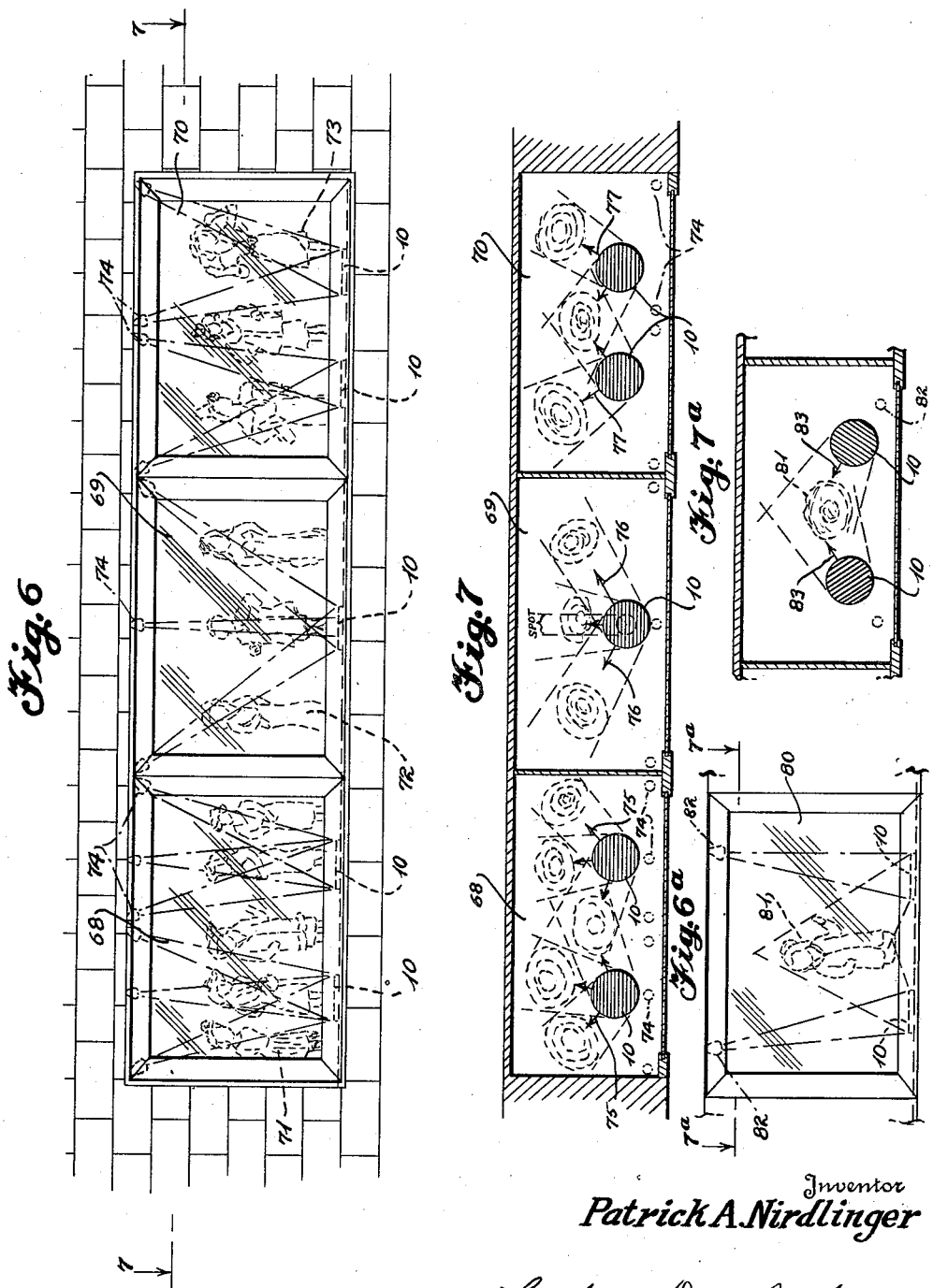

Patented Apr. 3, 1951

2,547,342

UNITED STATES PATENT OFFICE 2,547,342

REFLECTING MAT FOR DISPLAY WINDOWS

Patrick A. Nirdlinger, Chicago, Ill.

Application December 3, 1946, Serial No. 713,676

17 Claims. (Cl. 240—6)

1

This invention relates to improvements in lighting systems and, more particularly to a reflecting mat assembly designed for reflecting both spot and flood lighting for the purpose of delivering any number of beams toward exhibited merchandise placed in various parts of a display window, room, or the like.

The invention contemplates the use of a reflecting mat made up of a plurality of reflecting louver facets which constitutes a flexible unit that may be shaped or adjusted to assume any suitable contour such as a parabolic or spherical shape so that when associated with projector lamps to provide a concentrated spotlight upon a single objective while at the same time projecting a reflected flood of light on other exhibited articles. The reflecting mat preferably is positioned on the floor below the flood and spot projector lamps, and may be concealed from outside view so as not to obtrude into the vision of those inspecting the display in a show window, or other areas which it is desired to illuminate.

A further object consists in providing a reflecting mat unit comprising a plurality of longitudinally extending inclined facets arranged transversely of the mat, and in which each of the facets is formed with a curved or concave reflecting surface, and the upper edge of each reflecting facet is connected to the lower edge of an adjacent facet by an inclined side or stepped facet that is disposed at such an angle to the adjacent concave facet as to project the total reflection illuminated and thus insure the unobstructed delivery of the full reflected rays from the reflecting facets for either spot or flood lighting. The stepped facets may be colored with a non-reflecting material so that the mat will harmoniously blend with a rug or other floor covering upon which it may be placed, and at the same time produce the illusion to an observer, that the brilliant lighting is being projected from an invisible source.

Other objects and advantages of the invention will become apparent from the following description when taken in conjunction with the accompanying claims and drawings.

Referring to the drawings which show several preferred embodiments the invention may assume:

Figure 1 is a plan view of one form of a reflecting mat constructed in accordance with the present invention.

Figure 2 is a sectional view taken substantially along the line 2—2 of Figure 1.

Figure 3 is an enlarged detail side view of two adjacent reflecting facets.

2

Figure 4 is a plan view of a modified form of the invention showing three reflecting mats associated with a display window or the like.

Figure 5 is a plan view of a further modification.

Figure 6 is a front view of another modification.

Figure 6a is a view similar to Figure 6 showing a single display.

Figure 7 is a longitudinally sectional view taken substantially along the line 7—7 of Figure 6 and showing the projector lamps in dotted lines.

Figure 7a is a sectional view taken substantially along the line 7a—7a of Figure 6a.

Figure 8 is a detail side view of one of the reflecting facets having depending supporting end members.

Figure 9 is a plan view of a modified form of reflecting facet.

Figure 10 is a sectional view taken substantially along the line 10—10 of Figure 9.

Figure 11 is a detail sectional view taken substantially along the line 11—11 of Figure 8.

Referring to the drawings, in which like numbers indicate like parts in the several views, 10 designates a reflecting or specular mat assembly or unit which may be made of any suitable size and shape, and is preferably formed of flexible metal such as copper, brass or Alazak aluminum, so that it may be bent longitudinally into any suitable shape such as a parabolic or spherical contour by raising the flexible end portions thereof. The reflecting mat 10, for convenience of illustration is shown of circular formation and is provided with a plurality of transversely disposed downwardly inclined louver facets 11 which preferably extend the length of the mat and are shown of uniform width which, of course, may be varied, as to number, size and length. Each facet 11 is provided with an upper curved or concave highly polished reflecting or specular surface 12 (Fig. 3) and has its upper edge 13 connected to the lower edge 14 of an adjacent facet by an inclined side or stepped facet 15 which is disposed at such an angle to the vertical, as to insure the projection of the total reflected illumination in a converging beam that will escape impingement upon the adjacent stepped facet while at the same time produce a sufficiently wide band of illumination to insure delivery of a smooth field of light at any desired distance from the reflecting mat. The flexible mat 10 is arranged to rest on a rug or covering 16 on the floor 17 of a display window, room, or the like, so as to be positioned between the observer and the exhibited article to be illuminated and below the exhibited article. The entire mat may conform to a concave contour as shown in Figure 2 by having the ends supported and raised by spaced supporting dollies or forming devices 18. Thus, means are provided for flexing the mat so that it may assume a curved contour for altering the focal length of the reflected beams and also altering the focal contour of the concave reflecting facets, while at the same time varying the angle of their reflected beams.

Referring particularly to Figure 3, there is shown in detail, two of the concave reflecting facets A and B respectively, which are formed from a 4 inch radius located 15° from the vertical, with each of the stepped facets 15 being likewise 15° from the vertical, it will be evident that the mean angle of each reflecting facet 12 will incline at 15° from the horizontal. In this figure there is shown in dotted lines, vertical incident rays 19, 20, 21 and 22 which are substantially parallel upon reaching their associated reflecting facets. These rays or beams are projected from spot and flood projector lamps positioned above the mat at a desired distance to insure the reflected rays such as rays 23, 24, 28 and 29 being properly projected on the articles being displayed. As diagrammatically illustrated by facet A, (Fig. 3) the upper and lower edges of each of the concave facets or sections ranges from about 7½° to 22½° with the resultant beams projecting about 15° from the vertical and sufficient to avoid obstruction by the adjacent 15° step angle formed between the vertical ray 21 and the reflecting ray 24. It will, of course, be obvious, that when reflecting facets are formed to operate at greater than the indicated 15° mean angle, that the stepped facets 15 will of necessity be changed to a sufficient angle to allow unobstructed delivery of the full reflected beams. In other words, this step angle becomes definitely associated with the angle at the lower edge or section of each concave facet. This is illustrated in Figure 3 where the reflected ray 24 of direct ray 21 passes the adjacent stepped facet 15. While the concavities 12 each having a 4 inch radius have been found advantageous for a short distance projection, a longer than 4 inch radius for certain display purposes is often required in order to provide a more concentrated delivery when the projector lamps are positioned at a greater distance from the reflecting mat. On the other hand, some display windows lack sufficient depth for such projection and require facets of shorter focus.

The stepped facets or inclined portions 15 may be concave as shown in dotted lines as at 15' in Figure 3, and may have a colored non-reflecting surface 25 as particularly shown in Figure 10. The non-reflected colored surfaces 25 extend slightly beyond the connecting stepped facets (Fig. 10) so as to provide means for inhibiting glaring ridges and depressed corner angles. When the non-reflecting stepped facets 25 are provided, they serve to cause the mat 10 to harmoniously blend with the rug 16 or other floor covering upon which the mat may be placed, and also serve to provide the illusion that the brilliant lighting is being produced from an invisible ray, with the result that to an observer outside of the show window, there is no visual evidence that the mat is functioning to produce the observed illumination. The reflecting mat 10 is positioned so that the stepped facets 15 face the observer.

The specular concave reflecting facets 12 of the flexible mat 10 are relatively fixed with respect to each other through the stepped facets 15 and the concavity of the entire mat may be adjusted or varied by the dollies 18 as the particular working conditions may require. The mats 10 may be produced in several diameters, sizes and shapes, from 12 inches to 60 inches so that they may be grouped in different pleasing or desired forms. Tests have shown that a 36 inch mat can at once reflect a flood or a concentrated spot upon a single objective or it can reflect a flood and a concentrated spot upon a single objective while also serving to illuminate by flood reflected beams one or more other objectives.

The flood and spotlight projector lamps associated with one or more mats may be selectively provided with colored filters so that different colors may be reflected from the highly polished concave facets in order to produce the desired illumination effect. When the mat 10 rests on the floor of a window for illuminating merchandise on display therein, the stepped facets 15 are the only portions of the mat visible to the observer outside of the window so that the mat will have an appearance which conforms with the particular color of the rug or floor covering.

It will be seen that the stepped facets 15 are so associated and connected to the inclined concave reflecting facets 12 as to provide a flexible connection which permits the conformation of the entire mat assembly to a major parabolic or spherical condensing contour, by converting or changing the angle of the adjacent stepped facets 15. Each stepped facet constitutes a support that imparts stability to the individual reflecting concave surface or segment 12 and also to the complete mat assembly. The stepped facets also function to support the reflecting facets and the mat in proper alignment, thus, assuring smooth and uniform distribution of the reflected rays. Each individual colored stepped facet 25 reflects its color into the adjacent facet towards the observer, as clearly illustrated by the arrows 26 and 27 shown in Figure 8, and with minimized reflection so that the colored steps blend with the mat so as to mask its function, and give to an observer the impression that the light is projected from a concealed source not visible to him. In other words, the mat is so formed as to mask its function and avoid glare from light sources other than those located exactly in the focal centers of the projected beams.

The inclined stepped facets may be flat or concave as shown at 15' (Fig. 3) so as effectively to prevent reflection toward the observer while assuring complete delivery of the reflected beams to the object on display without danger of interference or the reflection being broken up by streaks and shadows. While bright reflections of the light source would at once, intrude upon the attention of the observer and impair his view of the illuminated exhibits, the minimized reflection produced by the colored steps 25 will so blend the softened image of the mat, with that of the rug or other floor covering, as to draw the attention of the observer exclusively to the lighted exhibits or articles on display.

When the entire mat 10 is curved to a concave contour as shown in Figure 2, the concave facets such as 31, 32 and 33 at the right hand end of the mat will have their angles increased from the normal 15° inclination which in turn will result in the beams being projected from the vertical at angles between 50° and 60°. The colored stepped facets 25 (Fig. 10) are also capable of micro readjustments when the angles of the reflecting facets are formed into different configurations such as into a parabolic or spherical contour. Likewise, the angle of inclination of such facets as 34, 35 and 36 at the opposite end of the mat will be altered with a resultant reflected beam of between 20° and 30°. Moreover, the concave facets at opposite ends of the mat will receive the rays from the same light source above the mat at an angle of about 10° which will result in a deflection of the reflected rays at an additional 20° angle below their normal. This differential is encountered with all mats and results in a delivery of the beams at lower and more efficient angles.

The size, shape, and length of the mats 10 including the concave facet 12 and the stepped facets 15 may vary as the best working conditions may require. For ordinary window display purposes, small 6-inch unit mats may be used having ½ inch step facets but, of course, larger size mats are required when the mats are to be used for illuminating larger areas, such as stores having massive corner windows or pillars. Moreover, while the reflecting mats 10 are shown as disposed horizontally for window lighting, for certain purposes where it is necessary to project the light from the sides, the reflecting facets may be disposed vertically or at any desired angle to produce the necessary illumination. The reflecting mat in addition to being used for window display purposes may also be used by photographers that may need such equipment for illuminating pictures or the like, or for illuminating interior exhibits or special groups of articles or pictures which can be made more attractive by the use of spot and flood lighting as projected by the improved reflecting mat.

In the modification disclosed in Figure 4, there is diagrammatically shown three articles such as a lady's hat 37 and blouses 38 and 39 that may be positioned in a display window in the manner as shown. Reflecting mats 40, 41 and 42 are associated with the articles on display and rest on the floor in a manner similar to the mat 10 previously described. Positioned above the window and associated with the mats may be a series of spot and flood projector lamps not shown, one of these lamps such as the center one is positioned directly above the mat 40 and the hat 37 so as to project white rays onto the mat which are reflected in the direction of the parallel rays 43. To the right of the white ray lamp is a lamp having an amber colored filter which reflects the light from the mat 40 in the direction of the beams 44 so as to illuminate the blouse 38. On the left of the white ray lamp is a lamp having a blue colored filter which projects the light from the mat 40 in the direction of the beams 45 so as to illuminate the blouse 39. It will be seen by this arrangement that the hat 37 will be lighted by the white beam 43, the amber beam 44 and the blue beam 45 and also by the white spot beam 43'. The blouse 38 will be illuminated by the amber light from the beams 44 while the blouse 39 will be lighted by the blue beams 45 so as to impart an attractive and pleasing illumination of the articles on display.

The mat 40 is provided with transverse concave straight facets 46 substantially similar in construction to the facets 12. The mat 41 may be formed of transverse facets having intermediate straight portions 47 and inclined converging end portions 48 which merge with the adjacent straight facets 47. The mat 42 on the other hand may be provided with transversely curved reflecting facets 49. The shape of the concave facets in the end mats 41 and 42 are such as to amplify the intensity of the reflected projecting beams 50 and 51 by concentrating the beams into a smaller area as indicated at 52 and 53 respectively, in order to illuminate articles positioned in these two areas. The mat 40, while shown associated with the mats 41 and 42, could be used independently or associated with other mats in any desired arrangement. Moreover, it will be seen that the conformation of the concave reflecting facets 46 may be of different shapes and not necessarily straight so as to amplify and control the reflected projection as may be desired.

In the modification shown in Figure 5 a group plan of reflecting mats similar in construction to the mats previously described is shown, and comprises a large circular mat 54 provided with concave reflecting facets 55 and surrounded by nine smaller reflecting mats 56, 57, 58, 59, 60, 61, 62, 63 and 64, each of which is provided with a plurality of concave facets 65 for projecting a concentrated beam of light on the hat 66 of a manikin, from spot and flood projector lamps positioned above the mats and the manikin 66. The concave reflecting facets of which these mats are formed instead of being straight may, if desirable, be of the configuration as shown by the mats 41 or 42 in Figure 4. The reflected beams from the several mats are concentrated and finally projected onto the hat of the manikin 66 as indicated by the beam lines 67 from the different reflecting mat sources.

The modification in Figures 6 and 7, shows display windows 68, 69 and 70 having associated with them reflecting mats 10 for the purpose of illuminating the display figures 71, 72 and 73 respectively, in each of these windows. Projector lamps 74 preferably hidden from the view of the observer, are separately positioned and accurately directed at the proper angles towards certain of the display figures, and are positioned substantially above the reflecting mats so as to direct the beams of light from the mats at such angles as are required by the relative positions of the display figures in each of the windows 68, 69 and 70. In window 68 five display figures 71 and a corresponding number of projector lamps 74 are shown arranged to be associated with two reflecting mats 10 located on the floor and preferably but not necessarily hidden from the view of the observer. Each of the lamps 74 is positioned so as to be associated with one of the figures 71 to illuminate the same. The two mats 10 are positioned relative to the display figures 71 and the projector lamps 74 in window 68 so as to provide a triple distribution of the reflected beams in addition to a contrasting flood or spot illumination as indicated by the arrows 75 (Fig. 7). In window 69 three display figures 72 are shown associated with three projector lamps 74 and a single mat 10. The mat 10 is positioned directly in front of and below the central display figure and in substantial vertical alignment with the centrally disposed projector lamps 74. It will be noted that in window 69 all three of the display figures are illuminated by the beams reflected from the mat 10 as indicated by the arrow 76 and that the central display figure is also spot lighted. In other words, the use of both flood and spot projector lamps, produces flood and spot reflected beams onto the central display figure and illuminates the end display figures by flood reflected beams from their associated lamps 74. Thus a multiple delivery of light is produced from a single reflecting mat 10 which may if desired be concealed from the view of the observer. In window 70 the three display figures 73 are associated with two reflecting mats 10 and the central display figure may be illuminated by a pair of centrally disposed projector lamps 74 while each of the end figures is lighted by separate projector lamps preferably disposed as shown, so as to produce a contrasting lighting with multiple intensities with the beams reflected from the mats 10 being directed as indicated by the arrows 77.

In Figures 6a and 7a there is shown a window 80 having a single display figure 81. A pair of spaced reflecting mats 10 are positioned on the floor so as to be hidden from the view of the observer. A pair of projector lamps 82 are illuminated above the mats 10 and are associated with each of the mats so as to direct their beams at such an angle as to illuminate the figure 81, in the manner as indicated by the arrows 83 (Fig. 7a).

While the mats 10 may be placed behind the window frames so as not to be visible, they need not be hidden from view since they are quite inconspicuous due to the fact that the brilliant illumination of the articles being displaced attracts the interest of the observer more than the location of the mats. In other words, it is not essential to place the mats 10 out of view of the observer in order to create the illusion that the brilliant lighting is being projected from an invisible source. In this connection it might be mentioned that the optical effect produced extends to points about 45° on either side of each of the mats 10 and allows the placing of the display articles forwardly and near the window yet assuring bright illumination of the article as clearly exemplified in Figure 6a. One or more of the reflecting mats 10 may be associated with any number of display figures and projector lamps so as to direct the reflecting beams at the proper angles to produce either flood or spot reflected beams or both. In other words, the mats may be so associated with the display figures and the projector lamps as to reflect a flood or concentrated spot upon a single objective or can reflect a flood and a concentrated spot upon any desired objective while also serving to illuminate other display articles. Manifestly, the mats may assume various selected formations relative to the display figures so as to produce better concentration of the reflected beams and a wider concentration of the total reflected light. While single projector lamps 74 have been shown associated with the mats and display figures it will be manifest that these lamps may be arranged in groups and vary in number so as to produce the desired reflected beams onto one or more display figures. Moreover, the mats are constructed and arranged to furnish illumination in both flood and spot intensities to any or all items on display.

The mats 10 may rest on a rug such as 16 (Fig. 1) and are concealed from the observer, and produce balanced intensities by delivery of the reflected beams from the floor onto the articles being displayed so as to obtain maximum width of the reflected beams. The reflected beams are also concentrated by the concave facets 12 so that some of the light from all the mats in each window will illuminate at least part of every figure on display in this window. The ends of the flexible mat 10 may be provided with supporting members such as the legs 12' (Fig. 8) that extend downwardly from opposite sides of each end of the facets 12 and co-act with the adjacent step facet 15 to maintain the mat in its proper fixed position.

While the mats 10 (Fig. 7) are shown provided with straight transverse reflecting facets, it will be manifest that these facets may be curved or composed of straight and inclined portions such as shown in Figure 4 by the mats 42 and 41 respectively, in order to concentrate the reflected beams into smaller areas and thus increase their intensities to attractively illuminate any one of the figures on display. Moreover, the projector lamps may be provided with filter colors to produce contrast illumination of any of the figures in order to accentuate the particular garments or figures on display. The reflecting mats may or may not be visible to the observer and may be associated with all types of windows for display purposes and also with other parts of a room such as French doors or the like in order to provide the effect of strong sunlight streaming through a room or window to illuminate the entire display by the mats, and may have utility for stage and screen illumination where the use of both flood and spot reflected beams are used for lighting objectives.

It will be seen that the reflecting mat capacity is such that any number of beams may be delivered towards exhibited merchandise placed in various parts of a window or the like, for display purposes. Moreover, beams of varying colors may be distributed toward a single reflecting mat which will reflect each colored beam at the item selected for the particular color and may be also utilized to reflect beams to other articles on display. Moreover, the concave reflecting surfaces 12 of the facets 11 are positioned so as to intercept each light beam from its associated projector lamp and reflect the same toward the display, with the result that the light beam from each of the facets escapes impingement upon an adjacent inclined side.

The reflecting mat is completely disassociated from the primary light sources, such as the reflector lamps, thus allowing the mat to serve one or a hundred beams at predetermined angles and selected colors. The fact that the reflecting mats are divorced from the light sources permits each mat to be placed in any advantageous position where it may best serve to illuminate one or more objectives as clearly exemplified in Figures 4 and 6. The concave formation of the reflecting facets 12 and the inclination of the stepped facets 15 insures full delivery of the reflected lighting without streaks and shadows, and also eliminates direct glare towards the observer. The mat may blend with the color of the rug or covering on which it rests so as to have the appearance of an inert pad of gray, pink, yellow or blue while projecting white light or colored lights on the articles being exhibited. The mats 10 are so associated with the colored projector lamps as not to indicate the color of the light beam reflected. The different beams of reflected light retain their individuality as to direction as well as color and intensity, and these reflected beams may be controlled or adjusted as conditions warrant. The flexibility of the mats 10 also allows each concave facet to assume its proportionate share of the parabolic sphere or contour of the curved mat body which will, of course, alter the focal length of the reflected beam from each facet in order to insure an equally smooth field of illumination in all selected formations.

By reason of the upper reflecting surfaces 12 of the facets 11 being curved or concave as contrasted to being flat, it will be observed that maximum reflection of the light is obtained by virtue of the fact that the condensing action of the concave facets which insures delivery of 100% of the reflected beam and a smooth field. On the other hand, plain facets cannot project beams that will clear the adjacent stepped facets with the results that a part of the reflected beam is lost or dissipated.

It will be understood that the several forms of the invention shown and described are merely illustrative of preferred embodiments, and that the reflecting mats may assume various sizes, shapes, and lengths, and be used either singularly or in combination to control the concentration and reflection of a maximum delivery of the reflected light to illuminate the displayed objects.

I claim:

1. In combination with a display window having a single display article therein, a pair of reflecting mats on the floor of the window between the display article and the observer and disposed on opposite sides of the display article, projector lamps above the mat, said reflecting mat including a plurality of longitudinally extending inclined facets arranged transversely of the mat, and each facet having curved reflecting surfaces, the upper and lower edges of said facets being connected to adjacent facets by inclined sides, the concave reflecting surfaces of the mat intercepting the light beams from the projector lamps and reflecting the same toward the display article so that the reflected light beam from each of the facets escapes impingement upon an adjacent inclined side, the projector lamps being disposed relative to the mats and the display article so that the figure is illuminated by the reflected beams from both mats.

2. In combination with a display window having articles therein for display purposes, a flexible reflecting mat resting on the floor of the window between the display articles and the observer, differently colored flood and spotlight projector lamps above the mat, said reflecting mat including a plurality of longitudinally extending inclined facets arranged transversely of the mat, and each facet having a concave reflecting surface, the upper and lower edges of said facets being connected to adjacent facets by inclined sides, the concave reflecting surfaces of the mat intercepting the light beams from the projector lamps and reflecting the same toward said display articles so that the reflected light from each of the facets escapes impingement upon an adjacent inclined side, said mat being constructed and arranged so that all reflected beams illuminate one of the articles and the other articles are illuminated by the beams from selected projector lamps.

3. In combination with a display window having articles therein for display purposes, spaced flexible reflecting mats resting on the floor of the window between the display articles and the observer, differently colored flood and spotlight projector lamps above the mats, said reflecting mats each including a plurality of longitudinally extending inclined facets arranged transversely of the mat, and each facet having a concave reflecting surface, the upper and lower edges of said facets being connected to adjacent facets by inclined sides, the concave reflecting surfaces of one of said mats intercepting the light beams from each of said projector lamps and reflecting the same toward the display articles so that reflected light from each of the facets escapes impingement upon an adjacent inclined side, and said projector lamps being separately positioned and accurately directed relative to the mats and the display articles to reflect a spot beam on at least one display article and flood beams on the other display articles.

4. In combination with a display window, a central figure and figures on each side of the central figure, a reflecting mat positioned on the floor of the display window and directly below and in front of the central figure, projector lamps above the central figure, said reflecting mat including a plurality of longitudinally extending inclined facets arranged transversely of the mat, each facet having a concave reflecting surface, the upper and lower edges of said facets being connected to adjacent facets by inclined stepped facets, the concave reflecting surfaces of said mat intercepting the light beam from each of said projector lamps and reflecting the same toward the figures so that the reflected light from each of the facets escapes impingement upon an adjacent step facet, the parts being constructed and arranged so that all the reflected beams illuminate the central figure and the end figures are illuminated by selected beams accurately directed toward the mat.

5. In combination with a display window, a central display figure and a group of display figures on each side of the central display figure, a pair of reflecting mats resting on the floor of the display window and positioned between the group of end figures and the central figure and in front of said figures, projector lamps above the display figures and corresponding in number to the display figures, each of said mats including a plurality of longitudinally extending inclined facets arranged transversely of the mat, each facet having a concave reflecting surface, the upper and lower edges of said facets being connected to adjacent facets by inclined stepped facets, said concave reflecting surfaces intercepting the light beams from the projector lamps and reflecting the same toward said display figures so that the reflected light beams from each of the facets escape impingement upon an adjacent stepped facet, the projector lamps being accurately positioned so that the reflected beams from the mats illuminate all of the display figures.

6. In combination with a display window and the like having a group of figures on display therein, a flexible reflecting mat positioned below and in front of the display figures, projector spot and flood lamps above the figures, said reflecting mat including a plurality of longitudinally extending inclined facets arranged transversely of the mat, each facet having a concave reflecting surface, the upper and lower edges of said facets being connected to adjacent facets by inclined stepped facets, said concave reflecting surfaces intercepting the light beams from said projector lamps and reflecting the same toward the display figures so that the reflected light beams from each of the facets escape impingement upon an adjacent stepped facet, the parts being constructed and arranged so that at least one of the figures is illuminated by a concentrated spot beam reflected from the mat and the other figures are illuminated by reflected flood light from the mat, and means for raising and supporting the ends of the flexible mat so that the mat may assume a curved contour for altering the focal length of the reflected beams from the mat and the focal contour of the concave reflecting facets and varying the angle of their reflected beams.

7. A light reflecting assembly of the class described including a centrally disposed reflecting mat and a plurality of reflecting mats enclosing the central mat, each of said mats including a plurality of longitudinally extended inclined facets arranged transversely of the mat, each facet having a concave reflecting surface, and the upper and lower edges of said facets being connected to adjacent facets by inclined stepped facets, each of the concave reflecting surfaces arranged to intercept the light beams from a projector lamp and reflect the same toward a display article so as to escape impingement upon an adjacent stepped facet, the parts being constructed and arranged so that all the light beams reflected from the mats are delivered to a display object above the same.

8. In combination with a display window or the like having articles therein for display purposes, a projector lamp above the display articles, a flexible specular mat positioned between the observer and the display articles and below the articles and conformable to reflect either or both flood or concentrated spot beams to illuminate the articles, said mat including a plurality of longitudinally extending specular facets arranged transversely of the mat and having flexible concave reflecting surfaces, and the upper and lower edges of said facets being connected to adjacent facets by inclined sides facing the observer, said concave reflecting surfaces intercepting the light beam from said projector lamp and reflecting it toward said display articles so that the reflected light beams from each of the facets escape impingement upon an adjacent inclined side.

9. In combination with a display window or the like having articles therein for display purposes, at least one projector lamp in focal center above the display articles, a flexible specular mat positioned between the observer and the display articles and below the articles and conformable to reflect either or both flood or concentrated spot beams to illuminate the articles, said mat including a plurality of longitudinally extending specular facets arranged transversely of the mat and having flexible concave reflecting surfaces, the upper and lower edges of said facets being connected to adjacent facets by inclined sides facing the observer, said concave reflecting surfaces intercepting the light beam from the projector lamp and reflecting the beam toward said display articles so that the reflected light beam from each of the facets escapes impingement upon an adjacent inclined side, and said inclined side being colored by non-reflecting material extending beyond the connecting stepped facets so as to prevent glaring ridges.

10. In combination with a display window or the like having articles therein for display purposes, projector lamps above the display articles, spaced flexible specular mats positioned between the observer and the display articles and below the articles and conformable to reflect either or both flood or concentrated spot beams to illuminate the articles, each of said mats including a plurality of longitudinally extending specular facets arranged transversely of the mat and having flexible concave reflecting surfaces, the upper and lower edges of said facets being connected to adjacent facets by inclined sides facing the observer, the concave reflecting surfaces of each mat intercepting the light beam from a projector lamp and reflecting the beam toward said display articles so that the reflected light from each of the facets escapes impingement upon an adjacent inclined side, and means for raising and supporting the ends of the flexible mat for altering the focal length of the reflected beams from each facet and the focal contour of the concave reflected facets while also varying the angle of the reflecting beams, said inclined sides being colored by non-reflecting material, the mats being arranged so that all reflected beams illuminate one of the articles and the other articles are illuminated by the beams from selected projector lamps.

11. In combination with a display window or the like having articles therein for display purposes, projector lamps above the display articles, a flexible specular mat positioned between the observer and the display articles and below the articles and conformable to reflect either or both flood or concentrated spot beams to illuminate the articles, said mat including a plurality of longitudinally extending specular facets arranged transversely of the mat and having flexible concave reflecting surfaces, the upper and lower edges of said facets being connected to adjacent facets by inclined sides facing the observer, said concave reflecting surfaces of said mat intercepting the light beam from each of the projector lamps and reflecting the same toward said display articles so that the reflected beams from each of the facets escape impingement upon an adjacent inclined side, said inclined sides being colored by non-reflecting material, the mats being arranged so that all reflected beams illuminate one of the articles and the other articles are illuminated by the beams from selected projector lamps, and means for raising and supporting the ends of the flexible mat for altering the focal length of the reflected beams from each facet and the focal contour of the concave reflected facets while also varying the angle of the reflecting beams.

12. A flexible specular mat arranged to be positioned between the observed and the article to be illuminated and below the said article and conformable to reflect either or both flood and concentrated spot beams from at least one projector lamp above the articles, said mat including a plurality of longitudinally extending inclined specular facets arranged transversely of the mat, each facet having a concave reflecting surface, the upper edges of said facets being connected to the lower edges of adjacent facets by stepped facets facing the observer, and each of said stepped facets diverging downwardly toward the lower edge of the adjacent concave facet, the reflecting surfaces of said mat intercepting the light beam from the projector lamp and reflecting the same toward the article to be illuminated so that the reflected beam from each of the specular facets escapes impingement upon an adjacent stepped facet, the flexibility of the mat providing a single means that serves any number of light beams and blends their total intensities to one or more spot or flood fields of illumination.

13. A reflecting mat as claimed in claim 8, in which the concave facets are transversely curved.

14. A reflecting mat as claimed in claim 8, in which the concave facets are provided with straight intermediate portions and inclined end portions.

15. A reflecting mat as claimed in claim 8, in which the stepped facets are concave.

16. A reflecting mat as claimed in claim 8, in which the stepped facets are colored with non-reflecting material.

17. A reflecting mat as claimed in claim 8, in which the concave facets include a plurality of straight and inclined sections.

PATRICK A. NIRDLINGER.

REFERENCES CITED

The following references are of record in the file of this patent:

UNITED STATES PATENTS

| Number | Name | Date |
|---|---|---|
| 1,279,262 | Clark | Sept. 17, 1918 |
| 1,612,100 | Dailey | Dec. 28, 1926 |
| 1,834,428 | Seitz | Dec. 1, 1931 |
| 2,058,548 | Arras | Oct. 27, 1936 |
| 2,125,319 | Schlumbohm | Aug. 2, 1938 |
| 2,210,391 | Wendel | Aug. 6, 1940 |
| 2,280,640 | Shockey | Apr. 21, 1942 |
| 2,310,790 | Jungersen | Feb. 9, 1943 |

FOREIGN PATENTS

| Number | Country | Date |
|---|---|---|
| 666,447 | France | May 21, 1929 |